US006538707B1

(12) United States Patent
Hayashi

(10) Patent No.: US 6,538,707 B1
(45) Date of Patent: *Mar. 25, 2003

(54) ELECTRO OPTICAL DEVICE

(75) Inventor: Masatake Hayashi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/121,255

(22) Filed: Sep. 15, 1993

Related U.S. Application Data

(63) Continuation of application No. 07/838,110, filed on Feb. 20, 1992, now abandoned.

(30) Foreign Application Priority Data

Feb. 20, 1991 (JP) ............................................. 3-047781
Feb. 20, 1991 (JP) ............................................. 3-047787
Feb. 20, 2001 (JP) ............................................. 3-047790

(51) Int. Cl.$^7$ .............................................. G02F 1/133
(52) U.S. Cl. ........................................ 349/32; 313/584
(58) Field of Search .......................... 359/50, 55, 54, 359/84, 87; 340/769, 771, 794; 313/484, 491, 582, 583, 584; 315/169.4, 167, 168, 169.1, 169.2, 169.3; 365/116; 349/32; 345/60, 39

(56) References Cited

U.S. PATENT DOCUMENTS

| | | | | |
|---|---|---|---|---|
| 3,823,394 A | * | 7/1974 | Byrum, Jr. et al. ...... | 315/169 R |
| 3,896,452 A | * | 7/1975 | Brown ....................... | 365/116 |
| 3,908,151 A | * | 9/1975 | Schermerhorn ............... | 345/62 |
| 3,958,233 A | * | 5/1976 | Schermerhorn ............. | 365/116 |
| 4,205,392 A | * | 5/1980 | Byrum, Jr. et al. ......... | 365/116 |
| 4,253,044 A | * | 2/1981 | Smith ....................... | 315/169.2 |
| 4,328,489 A | * | 5/1982 | Ngo ......................... | 315/169.2 |
| 4,423,356 A | * | 12/1983 | Sato et al. ................ | 315/169.2 |
| 4,430,601 A | * | 2/1984 | Boyd et al. ............... | 315/169.2 |
| 4,533,913 A | * | 8/1985 | Tezucar et al. ........... | 315/169.4 |
| 4,554,537 A | * | 11/1985 | Dick .......................... | 345/68 |
| 4,566,006 A | * | 1/1986 | Okamoto et al. ........ | 315/169.4 |
| 4,613,794 A | * | 9/1986 | Oida ........................ | 315/169.2 |
| 4,638,218 A | * | 1/1987 | Shinoda et al. .......... | 315/169.4 |
| 4,896,149 A | | 1/1990 | Buzak et al. | |
| 4,924,218 A | * | 5/1990 | Weber et al. ............. | 315/169.4 |
| 5,030,888 A | * | 7/1991 | Salavin et al. ........... | 315/169.1 |
| 5,077,553 A | * | 12/1991 | Buzak ......................... | 345/60 |

FOREIGN PATENT DOCUMENTS

GB        1348204        3/1974

OTHER PUBLICATIONS

Pleshkoi "AC Plasma Display Technology Overview", Proc. SID, vol. 20, 1979, pp. 127–130.*
Patent Abstracts of Japan, vol. 11, No. 231, No. JP 62–047932 published Mar. 2, 1987.
Patent Abstracts of Japan, vol. 14, No. 239, JP 2065031, Mar. 5, 1990.
Patent Abstracts of Japan, vol. 14, No. 529, JP 22–21966 published Sep. 4, 1990.

* cited by examiner

Primary Examiner—Kenneth Parker
(74) Attorney, Agent, or Firm—Sonnenschein, Nath & Rosenthal

(57) ABSTRACT

A plasma addressed liquid crystal display which includes a pair of spaced substrates upon which orthogonal electrodes are mounted and electro-optical material layer mounted in contact with a first group of electrodes on the first substrate and an ionizable gas between the substrate and the electro-optical material layer to provide a discharge region that functions as a visible display.

14 Claims, 10 Drawing Sheets

ELECTRO OPTICAL DEVICE

This is a continuation, of application Ser. No. 07/838,110, filed Feb. 20, 1992 now abandoned.

BACKGROUND OF THE INVENTION

1. Field of the Invention

The present invention relates to an electro-optical device using an ionizable gaseous medium as an address element and, more specifically to an image display device adapted to drive an electro-optical material layer by making use of plasma.

2. Description of Related Art

To assure that a liquid crystal display has high resolution and high contrast, there is generally carried out a method in which active elements such as transistors, etc. are provided for every display pixels so as to drive them (which method is so called an active matrix addressing system).

In this case, however, since it is necessary to provide a large number of semiconductor elements such as thin film transistors, the yield is not good particularly when the display area is enlarged, giving rise to problems and the cost is increased.

Thus, as the means for solving this problem, Buzaku et al have proposed in the Japanese Laid Open Application No. 217396/89 publication (corresponding to U.S. Pat. No. 4,896,149 and U.S. Pat. No. 5,077,553) a method of utilizing discharge plasma in place of semiconductor elements such as MOS transistors or thin film transistors, etc. as an active element.

The configuration of an image display device for driving a liquid crystal so as to make use of discharge plasma will be briefly described below.

In this image display device, as shown in FIG. 11, a liquid crystal layer 101 serves as an electro-optic material layer and adjacent plasma chambers 102 are arranged under a thin dielectric sheet 103 comprised of glass, etc.

The plasma chambers 102 are constituted by forming a plurality of channels 105 parallel to each other in a glass substrate or base plate 104. These chambers are filled with ionizable gas. Further, pairs of electrodes 106 and 107 parallel to each other are provided in respective channels 105. The electrodes 106 and 107 function as an anode and a cathode for ionizing gas within the plasma chambers 102 so as to generate discharge plasma.

On the other hand, the liquid crystal layer 101 is held by the dielectric sheet 103 and a transparent base plate 108. On the surface at the liquid crystal layer 101 side of the transparent base plate 108, transparent electrodes 109 are formed. These transparent electrodes 109 are perpendicular to the plasma chambers 102 constituted by the channels 105. The portions where the transparent electrodes 109 and the plasma chambers 102 intersect with each other correspond to respective picture elements.

In the above-mentioned image display device, by switching and scanning in sequence the plasma chambers 102 where plasma discharge is carried out, and by applying signal voltages to the transparent electrodes 109 on the liquid crystal layer 101 side in synchronism with the switching scan operation, these signal voltages correspond to respective picture elements. The liquid crystal layer 101 is thus driven.

Accordingly, the channels 105, i.e, plasma chambers 102 respectively correspond to one scanning lines, and the discharge region is divided every scanning unit.

Meanwhile, in image display devices utilizing discharge plasma as described above, it is considered that an increased display area is more easily realized as compared to image display devices using semiconductor elements, but various problems remain in putting image display devices utilizing discharge plasma into practice.

For example, forming channels 105 for constituting respective chambers 102 at the surface portion of the glass substrate 104 serving as a transparent dielectric substrate results in considerable difficulty in manufacturing. Particularly, forming channels 105 at a high density is very difficult.

Further, in the case where there is adopted a structure such that plasma chambers 102 are respectively constituted by channels 105, liquid crystal layer 102 sections corresponding to the projected portions or the glass substrate 104, which partition respective plasma chambers 102, become ineffective and portions are not driven. In addition, at the portions where the wall surfaces of respective channels 105 are formed as a slanting surface or a curved surface, the direction or the polarized state, etc. of a transmitted light is disturbed. This is a problem so as to obtain suitable luminance control, etc.

There is the possibility that the existence of the channels 105 exerts unfavorable large influences on the contrast and the transmissivity (or transmission factor) in the case where an image display is carried out.

Further, in order to scan plasma discharge, a drive circuit having a high voltage (about 150 to 500 volts) is necessarily required. For this reason, the drive circuit unit becomes large, and the cost is also increased.

Furthermore, when an attempt is made to drive the previously described image display device in accordance with the interlaced scanning system, inconveniences such as described below take place.

In conventional PALCs, when an interlaced drive is normally carried out, respective pixels are scanned only every other field (33 mill seconds, e.g., in the case of the NTSC system). At this time, when a moving pictorial image is displayed, images before one field are left within a screen for every other line. For this reason, particularly, at the end portion of a pictorial image, disagreeable fading-out occurs, so the picture quality may be substantially degraded. In addition, because of the inversion of the polarity of the liquid crystal, flicker of two frame periods takes place.

So as to solve this problem, in the same manner as in liquid crystal devices of the TFT System, it is possible to adopt, e.g., a method of converting an interlaced scanning to a sequential scanning by an image processing, a method of inputting a signal of one line to two scanning lines which combination is changed every field, or the like.

In any case, however, there results a great load on the drive circuit such that a line memory is required, and/or the writing time every line becomes one half. This causes the cost of the device to be increased.

SUMMARY OF THE INVENTION

In order to eliminate the above noted drawbacks, it is an object of the present invention to provide an electro-optical device such as an image display device which has excellent image qualities and is easily assembled into the device.

Another object of the invention is to provide an electro-optical device in which an operable voltage drive circuit can be used, thereby permitting the cost of the device to be reduced.

A further object of the invention is to provide an electro-optical device capable of eliminating, without alteration of the drive circuit, degradation of the dynamic resolution (resolution of a moving picture) when an interlaced operation is carried out.

In accordance with the present invention, there is provided an electro-optical device comprising a first substrate, a second substrate opposed to the first substrate, an electro-optical material layer, and a discharge chamber. The first substrate has a plurality of nonoverlapping first electrodes on a major surface thereof. The second substrate has a plurality of nonoverlapping second electrodes. The first and second electrodes are disposed spaced apart in the vertical and horizontal directions, respectively. The electro-optical material layer is disposed in contact with the first electrodes of the first substrate. The discharge chamber is disposed between the electro-optical material layer and the second substrate and is filled with an ionizable gas. The discharge chamber has a plurality of scanning units. Each scanning unit comprises a discharge region of a localized volume of ionized gas so that at least two scanning units are formed in a continuous space.

The inventive device may include a dielectric material layer disposed between the electro-optical material layer and the discharge chamber.

Preferably, the discharge region of all scanning units is formed as a continuous space.

Further, the inventive device may include scanning circuits for interlaced scanning of n:1.

According to another aspect of the present invention, there is provided an electro-optical device comprising a first substrate, a second substrate opposed to the first substrate, an electro-optical material layer, a discharge chamber, a first circuit, and a second circuit. The first substrate has a plurality of first electrodes on the inner surface thereof. The second substrate has a plurality of second electrodes. The first and second electrodes are spaced apart and extend in the vertical and horizontal directions, respectively. The electro-optical material layer is disposed in contact with the first electrodes of the first substrate. The discharge chamber is disposed between the electro-optical material layer and the second substrate so that display elements are defined by overlapping areas of the first electrodes and a discharge region. The second electrodes are disposed on the second substrate so that the discharge region extends over a plurality of scanning units. The discharge chamber is filled with an ionizable gas. The first circuit generates a first electrical signal which is applied to the first electrodes. The second circuit generates a second electrical signal which is applied to the second electrodes. The ionizable gas comprises an electrical switch which changes between plasma state and de-ionized state in response to the second signal which is applied.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

A first embodiment to which this invention is applied will now be described in detail with reference to the attached drawings.

The image display device according to this embodiments comprises a first substrate having, on a major surface, a plurality of first electrodes substantially parallel to each other; and a second substrate having, on a major surface, a plurality of second electrodes substantially perpendicular to the first electrodes and substantially parallel to each other. The first and second base plates are arranged substantially parallel to each other in such a manner that the first and second electrodes are opposite to each other, an electro-optical material layer being inserted between the first and second base plates in a manner so that it is in contact with the first electrodes of the first substrate. An ionizable gas is filled between the electro-optical material layer and the second substrate so that discharge regions result, the discharge regions corresponding to all scanning units having a spatially continuous portion, with localized plasma discharge between the first and second electrodes and being self-scanned.

In image display devices where discharge regions are spatially continuous, when discharge takes place at the adjacent discharge electrode, the discharge inception voltage is lowered a degree immediately thereafter as compared to the case where discharge dose not take place at the peripheral portion thereof.

This is based on the so-called priming effect (the effect so as to allow discharge to be easily commenced) that charged particles generated by discharge are diffused through the portion where the discharge regions are continuous.

Now, when a voltage applied across discharge electrodes is set to a discharge voltage lowered by the priming effect, the discharge shifts in succession to the adjacent discharge electrode. The self-scanning operation is thus carried out.

The structure of an image display device employed in this embodiment is of the so-called open cell structure in which all discharge regions are formed as a continuous space. Accordingly, there are no partition separating the discharge regions.

Figure 1:
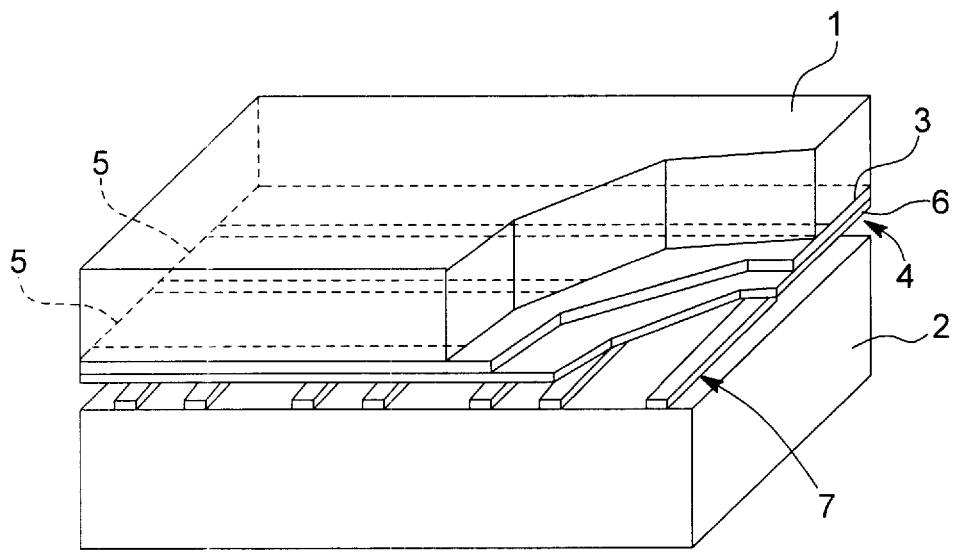
FIG. 1 is an enlarged perspective view of the invention showing, in a manner partially broken, an example of an image display device of the open cell structure.
Figure 2:
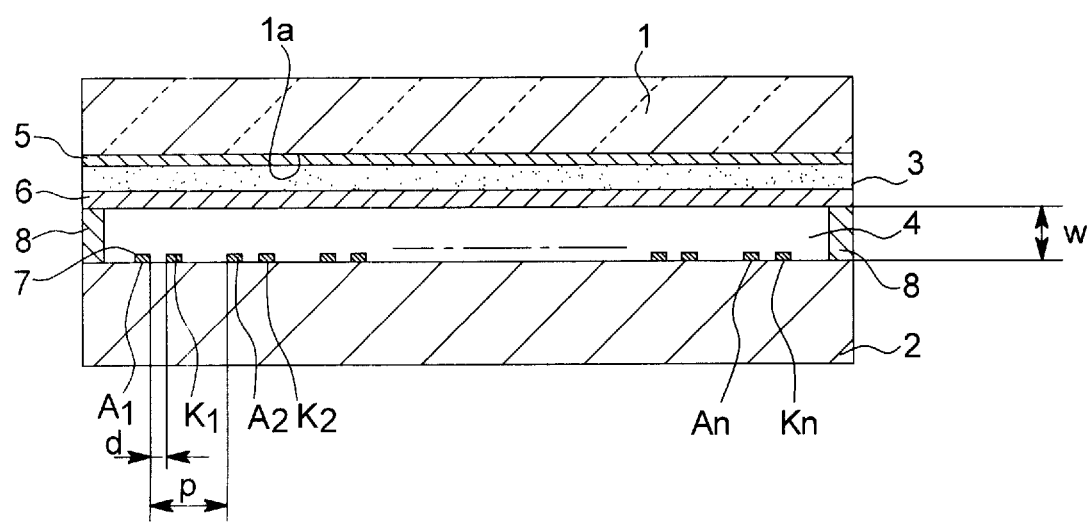
FIG. 2 is an enlarged cross sectional view of the example of the image display device of the open cell structure.

The configuration of the image display device of this embodiment will be first described. In the image display device of this embodiment, as shown in FIGS. 1 and 2, a liquid crystal layer 5 which serves as an electro-optical material layer is inserted between a flat and optically sufficiently transparent first substrate 1 and a similarly flat and transparent second substrate 2. The space between the liquid crystal layer 3 and the second substrate 2 is utilized as the discharge chamber 4.

The substrates 1 and 2 are both formed by a non-conductive and optically transparent material by taking into consideration the case where the image display device in this embodiment is of the transmission type. However, in the case where the image display device is constructed as a direct viewing or reflection type display device, it is sufficient that either one of the substrates is transparent.

The above-mentioned dielectric film 6 functions as an insulating shield layer of the liquid crystal layer 3 and the discharge chamber 4. If there were no dielectric film 6, there is the possibility that the liquid crystal material might flow into any of the discharge regions, or the liquid crystal material may be polluted by gas within the discharge region. It is to be noted that in the case where a solid-state or encapsulated electro-optic material, etc. is used in place of the liquid crystal material, there are instances where such a dielectric film 6 is not required.

In addition, since the dielectric film 6 is formed by dielectric material, the dielectric film 6 itself also functions as a capacitor. Accordingly, in order to sufficiently ensure the electric coupling between the discharge chamber 4 and the liquid crystal layer 3, and to suppress an electric field in the transverse direction, it is desirable that the dielectric film 6 be as thin as possible.

Discharge electrode groups 7 are formed as a belt-shaped electrode also on the second substrate 2. Further, by supporting the peripheral portions of the second substrate 2 by means of frame-shaped spacers 8, it is arranged with a predetermined spacing from the dielectric film 6. Thus, a space between the second substrate 2 and the dielectric film 6 is formed which serves as a discharge chamber generating discharge plasma. Accordingly, the discharge regions are spaces which are continuous in the entire display area.

Ionizable gas is filled into the discharge regions. As the ionizable gas, helium, neon, argon, mixture gas thereof, or the like may be used.

The outline of the configuration of the image display device has been described as above. On the respective substrates 1 and 2, electrodes for driving the liquid crystal layer 3 are formed, respectively. The configuration of these electrodes will now be described.

On the major surface 1a opposite to the second substrate 2 of the first substrate 1, a plurality of belt-shaped electrodes 5 having a predetermined width are formed. These electrodes 5 are formed of a transparent conductive material, e.g., Indium Tin Oxide (ITO), etc., and are optically transparent. Further, respective electrodes 5 are arranged in parallel to each other and are arranged perpendicularly to, e.g., the screen.

On the other hand, also on the major surface 2a opposite to the first substrate 1 of the second substrate 2, groups of discharge electrodes 7 are similarly formed. These discharge electrode groups 7 are also parallel linear electrodes, but they are arranged in a direction which is perpendicular to the electrodes 5 formed on the first substrate 1. These discharge electrode groups 7 are arranged in a horizontal direction on the screen. More particularly, these discharge electrode groups 7 are comprised of anode electrodes $A_0$, $A_1$, $A_2$, $A_3$ ... $A_{n-1}$, $A_n$ and alternate cathode electrodes $K_0$, $K_1$, $K_2$, $K_3$, ... $K_{n-1}$, $K_n$. By pairing these corresponding electrodes, respective discharge electrodes are constituted.

Figure 3:
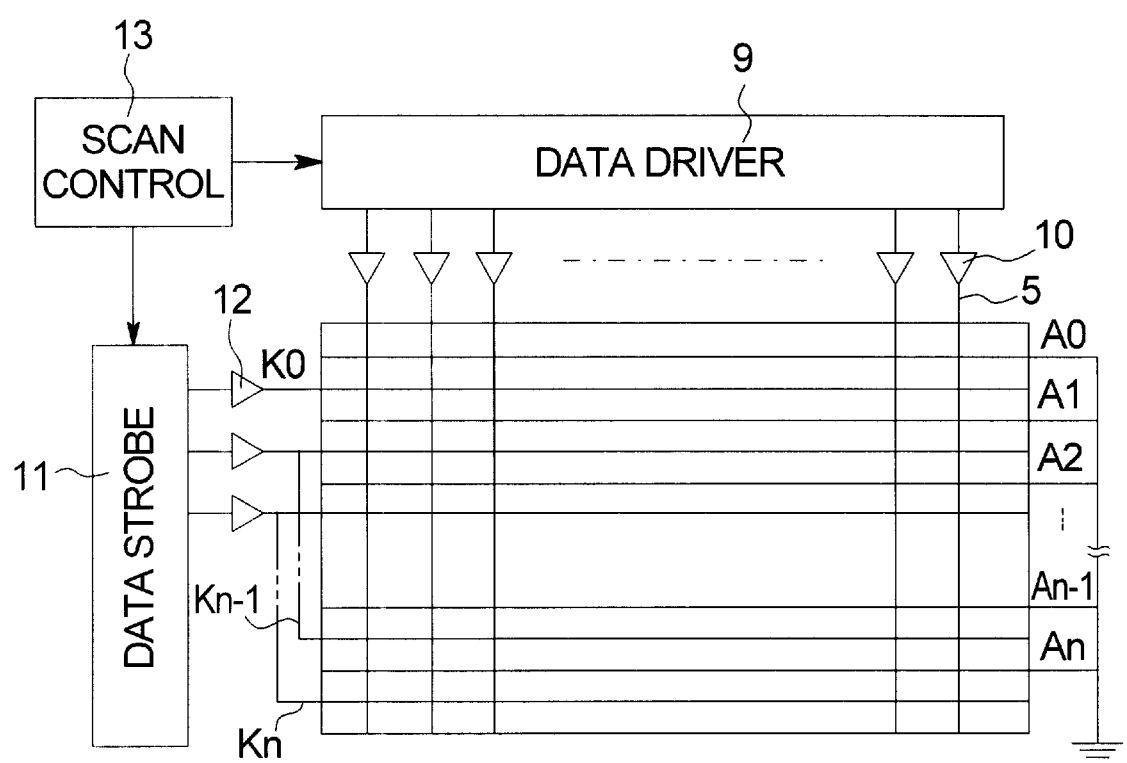
FIG. 3 is a view showing an electrode configuration for driving the liquid crystal layer.

The arrangement of the electrodes 5 formed on the first substrate 1 and the discharge electrode groups 7 formed on the second substrate 2 is shown in FIG. 3.

First signal application means comprised of a data driver circuit 9 and output amplifiers 10 are connected to the electrodes 5 on the first substrate 1. Thus, analog voltages outputted from the respective output amplifiers 10 are delivered as liquid crystal drive signals, respectively.

Second signal application means comprised of a data strobe circuit 11 and output amplifiers 12 are connected to respective cathode electrodes $K_0$, $K_1$, $K_2$, $K_3$ ... $K_{n-1}$, $K_n$ of the discharge electrode groups 7 on the second substrate 2. Thus, pulse voltages outputted from the respective output amplifiers 12 are delivered as data strobe signals, respectively.

Figure 5:
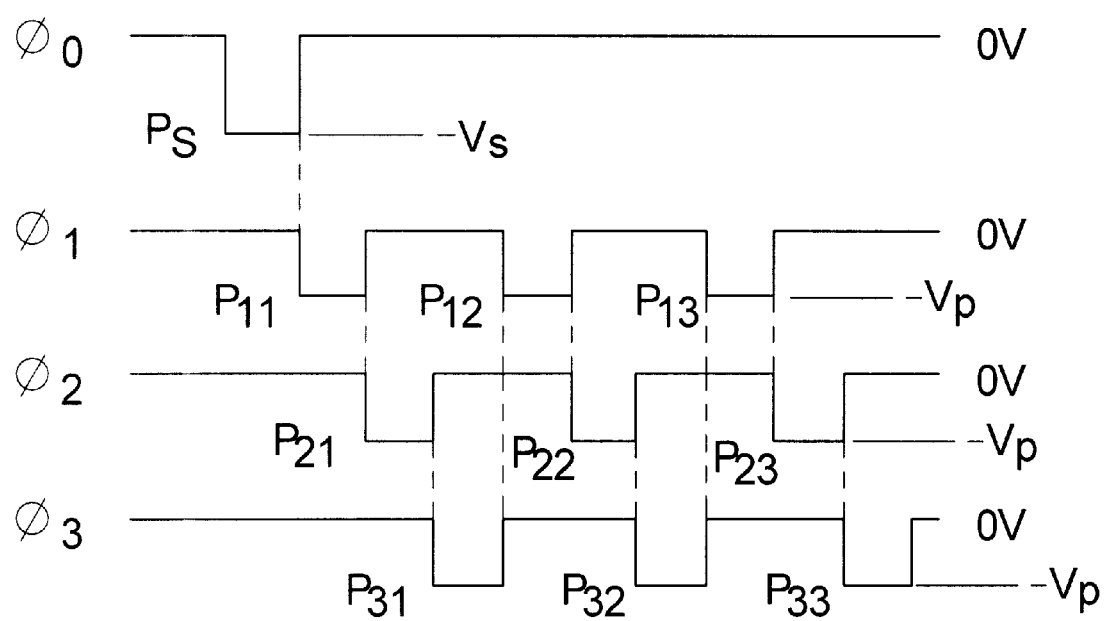
FIG. 5 is a waveform diagram of a pulse signal outputted to the discharge electrode.

An output $\phi$ (phase signals) from the data strobe circuit 11 are comprised of, e.g., four systems of $\phi_0$, $\phi_1$, $\phi_2$ and $\phi_3$ as shown in FIG. 5. By three phases of $\phi_1$, $\phi_2$ and $\phi_3$ thereof, strobe signals are sequentially delivered to cathode electrodes $K_1$, $K_2$, $K_3$ ... $K_{n-1}$, $K_n$. Accordingly, cathode electrodes $K_1$, $K_2$, $K_3$ $K_{n-1}$, $K_n$ are connected to outputs $\phi_1$, $\phi_2$ and $\phi_3$ in parallel every three scanning units.

Further, the output $\phi_0$ serves to deliver a start pulse, and is connected to the cathode electrode $K_0$ positioned at the extreme end.

On the other hand, a common reference voltage (ground voltage) is applied to the respective anode electrodes $A_0$, $A_1$, $A_2$, $A_3$ ... $A_{n-1}$, $A_n$.

Figure 4:
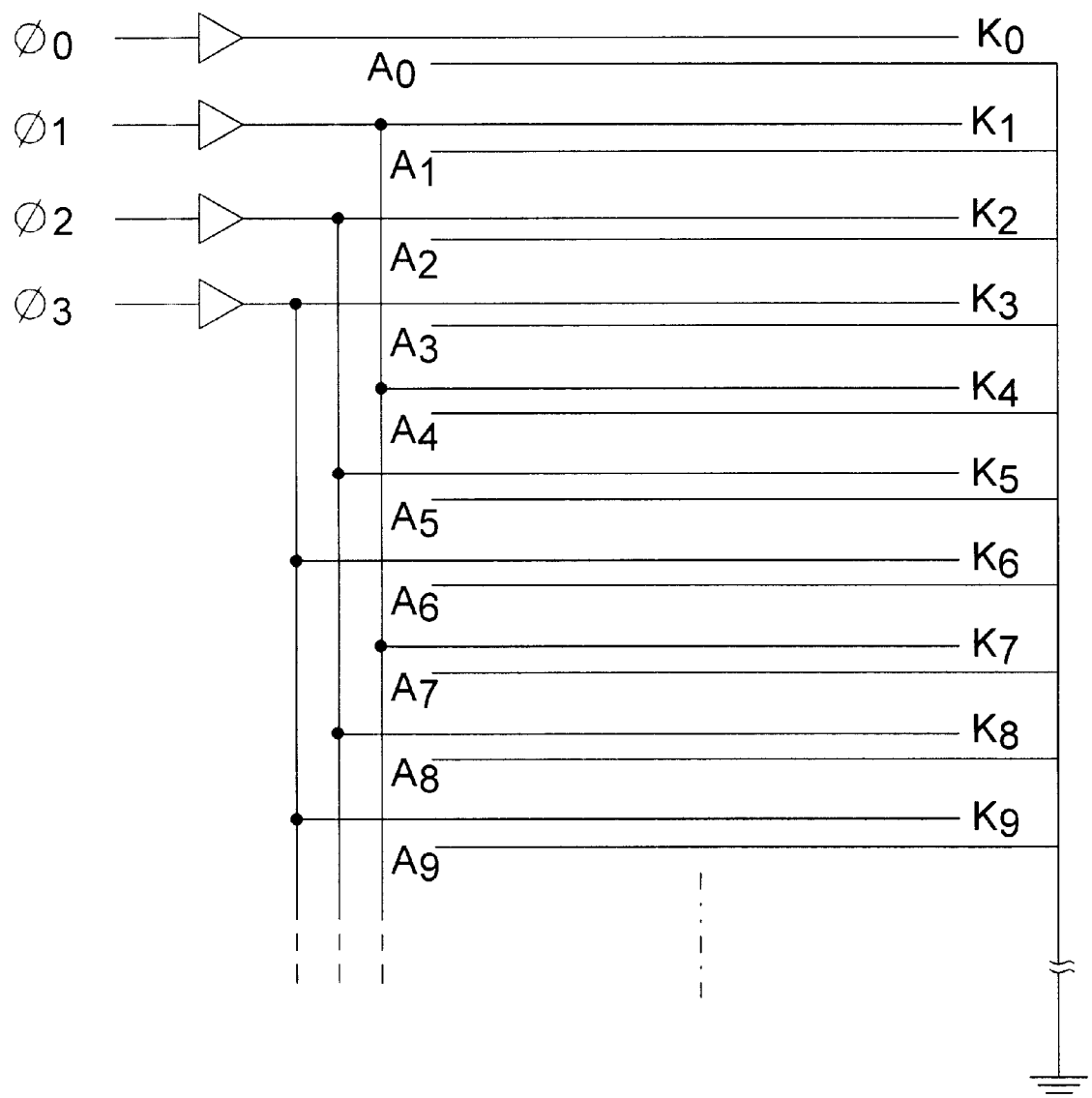
FIG. 4 is a view showing an arrangement and the connection state of discharge electrodes.

Accordingly, the connection structure of the discharge electrode groups 7 formed on the second substrate 2 is as shown in FIG. 4.

Further, in order to form an image over the entirety of the display screen, there is provided a scanning control circuit 13 which is connected to the data driver circuit 9 and to the data strobe circuit 11. This scanning control circuit 13 serves to control or regulate the functions of the data driver circuit 9 and the data strobe circuit 1 so as to carry out sequential addressing from row to row with respect to all pixel trains of the liquid crystal layer 3.

In the image display device constructed as described above, the liquid crystal layer 3 functions as a sampling capacitor for analog voltages which are applied to the electrodes 5 formed on the first substrate 1, and discharge plasma generated in the discharge regions functions as a sampling switch. Thus, an image display is carried out on the basis of the above-mentioned basic principle.

Figure 6:
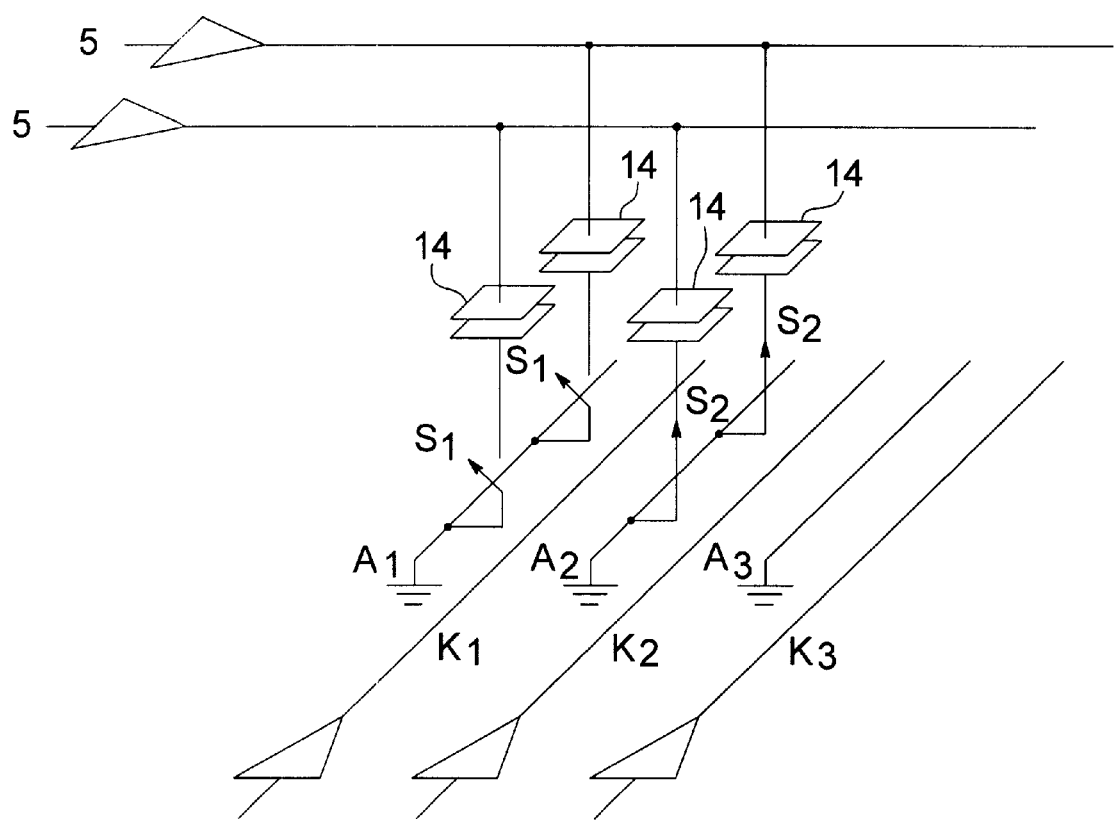
FIG. 6 is an equivalent circuit diagram for explaining the image display operation.

The model for explaining the image display operation is shown in FIG. 6. In FIG. 6, the liquid crystal layer 3 corresponding to respective pixels can be understood as capacitor models 14, respectively. Namely, the capacitor models 14 indicate capacitive liquid crystal cells formed at the portions where the electrodes 5 and ionized gas regions overlap with each other.

It is now assumed that analog voltages are applied to the respective electrodes 5 by the data driver circuit 9. Here, assuming that nod ata strobe signal (pulse voltage) is applied to the cathode electrode $K_1$ of the second substrate 2, i.e., the cathode electrode $K_1$ is in an OFF state, and discharge on the anode electrode $A_1$ and the cathode electrode $K_1$ is not produced. As a result, gas in the vicinity thereof is brought into a non-ionized state. Accordingly, the plasma switch $S_1$ (the electrical connection of the electrode 5 and the anode electrode $A_1$) is also placed in an OFF state. As a result, even if an analog voltage is applied to the electrodes 5, there is no change in a potential difference applied to the respective capacitor models 14.

On the other hand, if a data strobe signal is applied to the cathode electrode $K_2$ of the second substrate 2, i.e., the cathode electrode $K_2$ will be in an ON state, and gas is ionized by discharge between the anode electrode $A_2$ and the cathode electrode $K_2$, so a belt-shaped ionized region (discharge plasma) takes place along these electrodes $A_2$ and $K_2$. Thus, by the so-called plasma switching operation, there results a state where the electrode 5 and the anode electrode $A_2$ are electrically connected. Namely, from consideration of the circuit operation, there results the state equivalent to the state where the plasma switch $S_2$ is tuned ON.

As a result, an analog voltage delivered to the electrode 5 is stored in a capacitor model 14 of the column where the cathode electrode $K_2$ is in a strobe state. Even after strobe to the cathode electrode $K_2$ is completed, so discharge plasma is dissipated or lost, for a time period until the next strobe is carried out (during at least a field interval of that image), this analog voltages remains in the state where it is stored in the respective capacitor models 14. As a result, this analog voltage is not changed due to the influence of changes at subsequent times of the analog voltages which are applied to the electrodes 5.

Accordingly, when an approach is employed to allow the cathode electrodes $K_1$, $K_2$, $K_3$ ... $K_{n-1}$, $K_n$ to be subjected to sequential addressing to apply data strobe signals thereto, and to apply at the same time liquid crystal drive signals as analog voltages to the respective electrodes 5 in synchronism with application of the data strobe signals, the plasma switch functions as an active element in the same manner as in the case of the semiconductor elements such as thin film transistors, etc. Thus, the liquid crystal layer 3 is driven in the same manner as in the case of the active matrix addressing system. In this case, belt-shaped ionized regions are produced between anode electrodes $A_1$, $A_2$, $A_3$ ... $A_{n-1}$, $A_n$ and cathode electrodes $K_1$, $K_2$, $K_3$ ... $K_{n-1}$, $K_n$ which are respectively paired with each other corresponding to respective scanning lines. Namely, it will be seen that these ionized regions are scanning units, respectively.

In the image display device of this embodiment, discharges on respective scanning lines are self-scanned. The self-scanning operation will now be described.

When it is now assumed that the discharge inception voltage in the state where there does not exist any discharge at the periphery is $V_B$, the discharge inception voltage immediately after the adjacent line is discharged is $V_{b1}$, and the discharge inception voltage immediately after a line spaced by n lines is $V_{bn}$, the relationship expressed as $V_B > \ldots > V_{b3} > V_{b2} > V_{b1}$ holds. This is based on the priming effect produced by diffusion of charged particles generated by discharge.

As shown in FIG. 5, a start pulse $P_s$ is first applied to the cathode electrode $K_0$ by an output $\phi_0$. A potential difference $V_s$ between the cathode electrode $K_0$ and the anode electrode $A_0$ by this start pulse $P_s$ is larger than a discharge inception voltage $V_B$ in the state where there does not occur any discharge at the periphery. Namely, the relationship expressed as $V_S \geq V_p$ holds.

As a result, discharge takes place between the cathode electrode $K_0$ and the anode electrode $A_0$. Thus, discharge plasma is produced.

Then, simultaneously with completion of the start pulse $P_s$, a scanning pulse $P_{11}$ is applied by an output $\phi_1$. Thus, the scanning pulse $P_{11}$ is applied to all cathode electrodes $K_{3n+1}$ (n=0, 1, 2 ...) which are connected in parallel.

Here, when a potential difference $V_p$ by the scanning pulse $P_{11}$ is set so that it falls within the range of $V_{b1} < V_p < V_{b2}$, discharge is started only on the discharge electrode where the discharge inception voltage is dropped by the priming effect, i.e., the cathode electrode $K_1$ adjacent to the cathode electrode $K_0$.

Further, when the scanning pulse $P_{11}$ is completed, a scanning pulse $P_{21}$ is applied by an output $\phi_2$ to all the cathode electrodes $K_{3n+2}$ (n=0, 1, 2, ...) which are connected in parallel. As a result, discharge is produced in turn only on the cathode electrode $K_2$ adjacent to the cathode electrode $K_1$.

Similarly, a scanning pulse $P_{31}$ is applied by an output $\phi_3$. As a result, discharge is carried out on the cathode electrode $K_3$.

When the scanning pulse $P_{31}$ is completed, a scanning pulse $P_{12}$ is applied by the output $\phi_1$ for a second time. As a result, the scanning pulse $P_{12}$ is applied to all the cathode electrodes $K_{3n+1}$ (n=0, 1, 2 ...). It is to be noted that discharge is excited in turn only on the cathode electrode $K_4$ adjacent to the cathode electrode $K_3$ where discharge has been produced immediately before. At this time, at the cathode electrode $K_1$ spaced by two electrodes, there is less lowering of the discharge inception voltage by the priming effect, so no discharge takes place. At times subsequent thereto, all lines are sequentially scanned in a manner similar to the above.

As stated above, in this embodiment, by only a drive circuit of four systems in total of three phases of outputs $\phi_1$, $\phi_2$ and $\phi_3$ and an output $\phi_0$ for the start pulse, all lines are driven.

It is to be noted that while explanation has been given only in connection with three-phase in this embodiment, a further increased number of output systems may be implemented if desired. For example, this image display device may be driven by 10 phases (thus the cathode electrodes are connected in parallel every 10 in cathode electrode). In this case, while the number of drive circuits for outputting scanning pulses is increased, the condition of the scanning pulses is given by the relationship expressed as $V_{b1} < V_p < V_{b9}$, so the voltage margin is advantageously widened. Accordingly, it is sufficient to set the number of output systems depending upon the degree of diffusion of charged particles.

Further, a pilot discharge electrode in a discharge state at all times may be provided adjacent to the outside of the cathode electrode $K_0$. Thus, such a start pulse so to satisfy the condition of $V_{b1} < V_s$ may be used. As a result, the amplitudes at all electrodes to be controlled can be held down to a small value. This is advantageous for the design of circuit.

As stated above, by carrying out the self-scanning operation by making use of the priming effect, the number of drive circuits for discharge electrodes can be reduced to a great degree. Moreover, the drive voltage for the discharge electrode can be lowered. Accordingly, the cost of the drive circuit for the plasma section can be substantially reduced.

Further, since the number of electrodes connected to the display unit is substantially reduced the mounting becomes very simple. Moreover, since the number of drive circuits is not dependent upon the number of scanning lines, the drive circuit can be widely used.

Furthermore, no complicated structures for carrying out the self-scanning is required, and such self-scanning can be very easily realized by adopting the open-cell structure. In addition, ordinary scanning can also be carried out by using the same device.

Meanwhile, in the case where the open-cell structure is employed, since the discharge regions are formed as a continuous space over the entire screen, degradation of resolution due to diffusion of charged particles generated by discharge is prevented. Such problem can be solved by employing a method described below.

As is well known, with respect to the pressure of gas filled into the discharge chamber 4, when thy pressure becomes high, the mean free path of the charged particles becomes small, resulting in a localized tendency. Accordingly, by setting the gas pressure to a high value, it is possible to control to some degree the discharge plasma so that it has reasonable spreading.

It however should be noted that when the gas pressure is high, that there are instances where the discharge inception voltage becomes high. With respect to such an undesired phenomenon, regulation accomplished by allowing the distances between discharge electrodes, i.e., the distances d between anode electrodes $A_0, A_1, A_2, A_3 \ldots A_{n-1}, A_n$ and cathode electrodes $K_0, K_1, K_2, K_3 \ldots K_{n-1}, K_n$, respectively, to be reduced inversely proportional to the gas pressure according to Paschen's law.

Although optimum values of the gas pressure and/or the distance d between electrodes may vary depending upon the kind of gas used, or other factors when, e.g., Ne—Ar mixture gas is used and the electrode distance d is set to be 0.1 mm, discharge was able to be conducted at 1 atmospheric pressure in an actual device.

In addition, also by forming the gap interval W of the discharge chamber 4 so that it is small makes it possible to control the effective spreading of the discharge plasma to some degree. From an experimental point of view, if the gap interval W is caused to fall within the range expressed as W<P with respect to the pitch P of the discharge electrodes, localization can be sufficiently realized.

By taking the above-mentioned measure, degradation in resolution due to diffusion of the charged particles can be eliminated. In this case, even if discharge plasma regions spread to some degree and such discharge plasma regions are in the state where they overlap each other, this does not cause substantial fading-out, etc. For example, in the case where discharge plasma regions corresponding to respective scanning units overlap each other, at the intermediate portion of pairs of adjacent discharge electrodes (pairs of anodes and cathodes corresponding to respective scanning units), the writing of signals is carried out twice by discharge at the corresponding two discharge electrode pairs. However, a signal written by the operation at the second time is actually held for a time interval of one field or one frame. Assuming that there is employed, e.g., non-interlaced scanning having 400 scanning lines, a signal written by the operation at the first time is held only for a time period corresponding to one line. On the contrary, a signal written by the operation the second time is held for a time period corresponding to 399 lines. Accordingly, in this case, the amount of crosstalk resulting by writing a signal by the operation at the first time becomes equal to $\frac{1}{400}$ (=0.25%). This is negligible.

One of the advantages of the employment of the structure of this embodiment is that manufacturing is very simple.

In the image display device of this embodiment, the discharge regions 4 are formed as a continuous space. As a result, there is no necessity of forming grooves in the second base plate 2. Accordingly, complicated channel processing becomes unnecessary. Thus, the production is substantially improved.

Further, the ineffective portion and/or disturbance caused by transmitted light which were a problem in the grooved structure is eliminated. Also the characteristics such as contrast or transmissivity, etc. can be remarkably improved.

It should be noted that while the invention has been described relative to an embodiment the invention is not limited to such an embodiment, and the structure or shape, etc. of the plasma chamber can be arbitrarily selected. It is preferable that there be space which encompasses all of the scanning units. Thus, the self-scanning utilizing the priming effect can be accomplished.

However, the discharge regions are formed as a continuous space over the entire screen in the image display device of this embodiment. Also a configuration with partitions can be used between every plural electrode pairs. Also in this case, the number of channels can be reduced to a great degree as compared to the case where respective discharge electrode pairs are formed in channels for every pair. Thus, the characteristics can be improved during manufacture.

As is clear from the foregoing description, in the image display device of this invention, it is possible to reduce a large degree the number of channels or partitions for separating the ionized regions (plasma chambers) for every scanning unit, thus to simplify the manufacture. Particularly, when there is employed a configuration such that plasma chambers are formed as a single continuous space over the entire screen, it becomes unnecessary to form channels or partitions. Thus, the manufacture thereof is greatly simplified.

Further, ineffective portions, etc. necessarily occurring in the case where any channels or partition exists can be decreased. As a result, the transmissivity and/or contrast are improved, thus improving the picture quality.

In addition, in the image display device of this embodiment, the priming effect will be naturally provided. Thus, stable discharge can be carried out.

When a space extending over all of the scanning units is provided, the self scanning using the priming effect can be carried out.

For this reason, the drive circuit for the plasma discharge can be reduced. Accordingly, the drive circuit can be compact and the circuit configuration can be simplified. Thus, the cost of the device can be reduced.

A second embodiment to which this invention is applied will now be described in detail.

The device of this embodiment is the same structure as the first embodiment. However, the device according to the second embodiment has linear discharge plasma regions corresponding to scanning lines which are subjected to sequential scanning so as to thereby drive an electro-optic material layer, characterized in that the discharge plasma regions are scanned in accordance with an interlaced scanning system of n:1, and that spreading of the respective discharge plasma regions is to spread n times greater than the scanning unit.

In the image display device of this embodiment, the discharge plasma regions are scanned in accordance with the non-interlaced scanning system of n:1, and the spreading of respective discharge plasma region corresponds to n scanning lines or more. For example, in the case of the interlaced scanning of 2:1, the spread (width) of the respective discharge plasma regions is set so they spread to a size which is twice as large as the scanning unit.

When interlaced scanning is carried out by discharge of plasma which has such a spread, all of the pixels on the screen are completely rewritten with one field. As a result, there is no possibility that any previous image remains.

Accordingly, the problem of degradation (occurrence of fading-out) of the dynamic resolution followed by the interlaced scanning is eliminated.

The configuration of the image display device of this embodiment is the same as that of the first embodiment.

It is to be noted that the interlaced operation of n:1 is carried out in this embodiment. In view of this, the display operation will now be described by using an example of the interlaced scanning of 2:1.

In the case of an interlaced scanning of 2:1, scanning lines are scanned at a rate of one to two lines. For example, in the even fields, even lines are sequentially selected; and in the odd fields, odd lines are selected. Namely, in the even fields, data strobe signals are sequentially applied to even cathode electrodes $K_2$, $K_4$, $K_5$ . . . and in the odd fields, data strobe signals are sequentially applied to odd cathode electrodes $K_1$, $K_3$, $K_5$ . . .

At this time, by application of data strobe signals to the respective cathode electrodes $K_1$, $K_2$, $K_3$, . . . $K_{n-1}$, $K_n$, discharges take place between these cathode electrodes and the anode electrodes $A_1$, $A_2$, $A_3$. . . $A_{n-1}$, $A_n$. As a result, discharge plasma is produced. The width of the discharge plasma region is set to have a value which is greater by a factor of two than the scanning unit (i.e., the pitch P of the discharge electrode groups 7).

It is to be noted that the spread of the discharge plasma region is governed by the kind and pressure of which gas fills the discharge region 4, the intervals between the electrodes for discharge and the shape of the discharge electrode, and the gap interval between the discharge regions 4, etc. By setting these to suitable values, it is possible to control the spread so that it corresponds with the previously described desired spread.

As is well known, with respect to the pressure of the gas which fills the discharge regions, as such pressure becomes high, the mean free path of the charged particles becomes small, resulting in a localized tendency. Accordingly, by setting the gas pressure to a suitable value, it is possible to control the discharge plasma so that it has a reasonable spread.

It, however, should be noted that when the gas pressure is high, that there are instances where the discharge inception voltage becomes high. With respect to such an undesired phenomenon, regulation can be accomplished by changing the distances between the discharge electrodes,i.e., the distances d between anode electrodes $A_1$, $A_2$, $A_3$ . . . $A_{n-1}$, $A_n$ and cathode electrodes $K_1$, $K_2$, $K_3$ . . . $K_{n-1}$, $K_n$, respectively. The distances can be reduced inversely proportional to the gas pressure in accordance with Paschen's law.

Further, by selecting the gap interval W between the discharge regions 4, it is possible to control the effective spread of the discharge plasma to some degree.

As an example, for example, a setting of the electrode pitch P to 0.4 mm, with the gap interval W of the discharge region equal to 0.4 mm using Ne gas (+0.5% Ar) as the gas, and the gap pressure selected to be 120 Torr, the width of the discharge plasma region will be approximately twice as large as the scanning unit.

Figure 7:
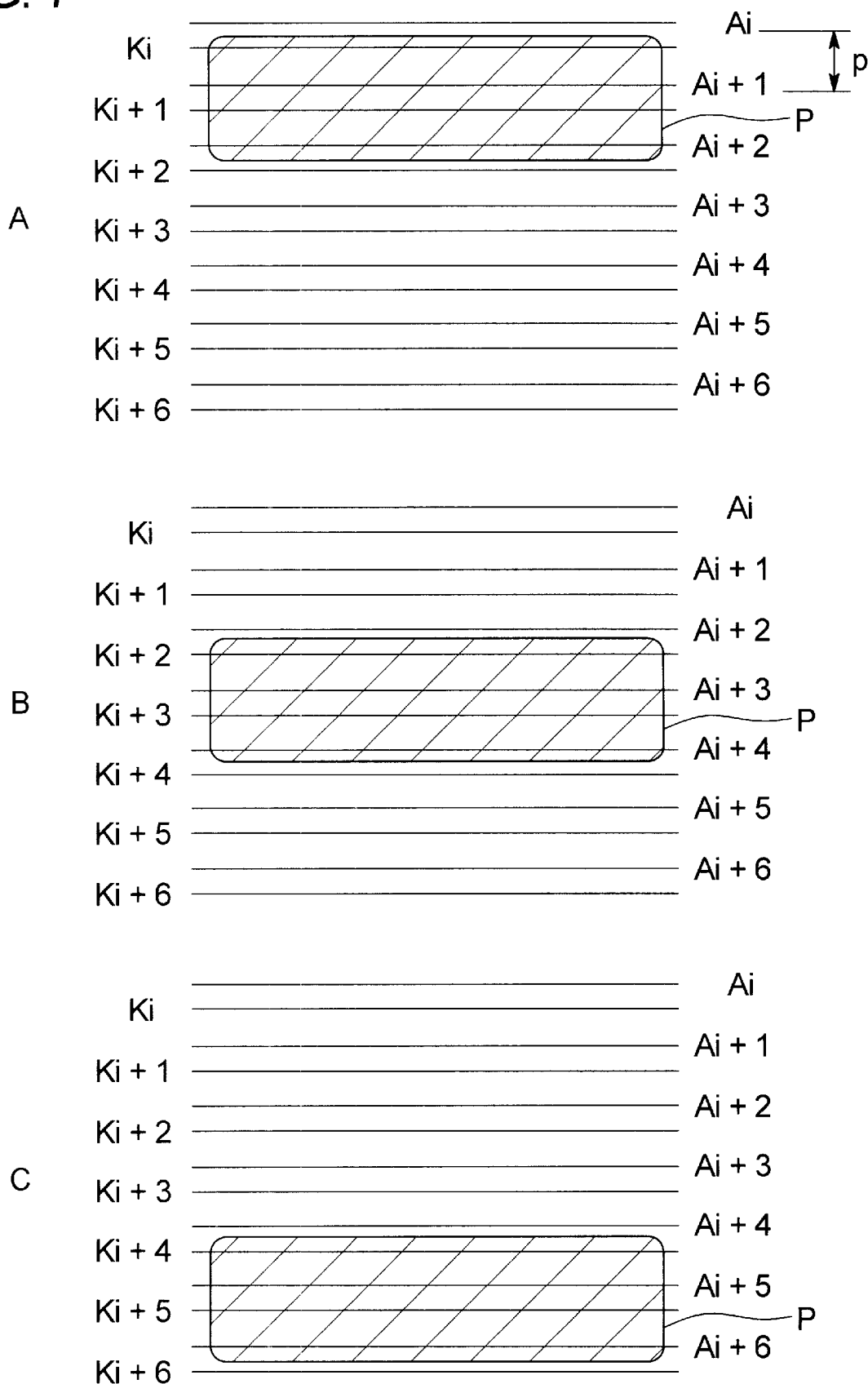
FIGS. 7A, 7B and 7C are views showing how discharge plasma in the even fields are scanned in the embodiment to which this invention is applied.

How the discharge plasma is scanned is shown in FIGS. 7A, 7B and 7C and FIGS. 8A, 8B and 8C. For example, in the even fields, as shown in FIGS. 7, data strobe signals are sequentially delivered to even cathode electrodes . . . $K_{i+1}$ $K_{i+3}$, $K_{i+5}$ . . . (i is an odd number). Thus, discharge plasma regions P are formed every other line. The state where the cathode electrode $K_{i+1}$ is turned ON is shown in FIG. 7A, the state where the cathode electrode $K_{i+3}$ is turned ON is shown in FIG. 7B, and the state where the cathode electrode $K_{i+5}$ is turned ON is shown in FIG. 7C.

At this time, since the width of the discharge plasma region sequentially scanned is approximately twice as large as the electrode pitch P, the liquid crystal layer 3 is driven in accordance with analog voltages which are applied to the electrodes 5 over the entire region of the screen.

Figure 8:
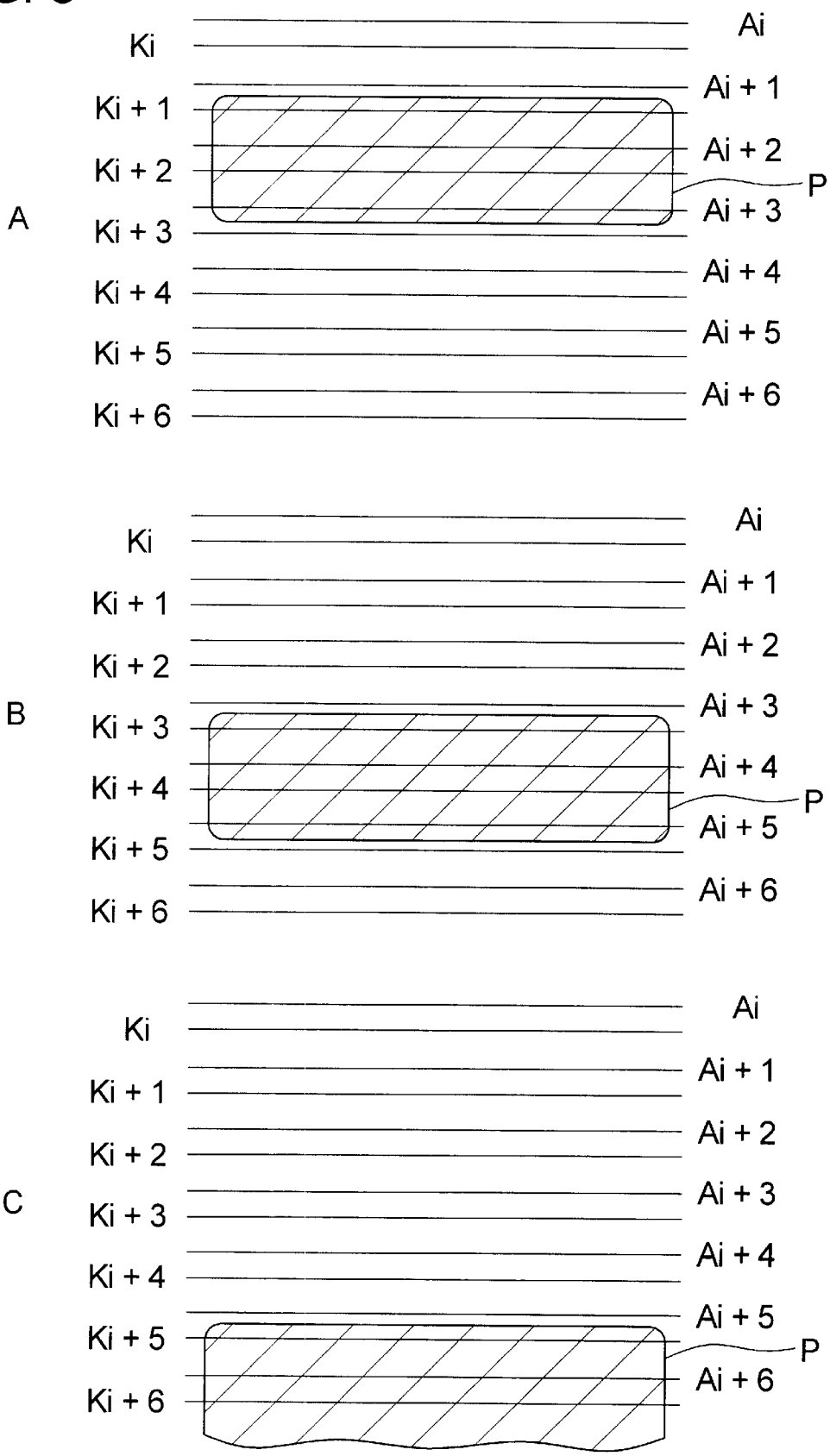
FIGS. 8A, 8B and 8C are views showing how discharge plasma in the odd fields are scanned in the embodiment to which this invention is applied.

On the other hand, when it is desired to write the odd field, the data strobe signals are sequentially delivered to the odd cathode electrodes . . . $K_{i+2}$, $K_{i+4}$, $K_{i+6}$ . . . as shown in FIGS. 8A, 8B and 8C. Thus, discharge plasma regions P are formed every other line. Namely, the state where the cathode electrode $K_{i+2}$ is turned ON is shown in FIG. 8A, the state where the cathode electrode $K_{i+4}$ is turned ON is shown in FIG. 8B, and the state where the cathode electrode $K_{i+6}$ is turned ON is shown in FIG. 8C.

Accordingly, also in the odd fields, for the same reason as in the even fields, the liquid crystal layer 3 is driven over the entire region of the screen.

Thus, both in the even field and in the odd field, selection of cathode electrodes is carried out every other line. However, since the discharge plasma region has a width corresponding to two lines, all pixels on the screen are completely refreshed within one field. Accordingly, any problem of degradation of the dynamic resolution followed by the interlaced scanning does not take place.

Further, since the inversion of the polarity of the liquid crystal layer 3 is completed during one frame period, and there is no possibility that flicker of two frame period, and there is no possibility that flicker of two frame period which occurred in the prior art will take place.

In addition, in this embodiment, it is sufficient for the drive circuit side to carry out a simple interlaced scanning. Thus, it is unnecessary to implement any special means in order so as to take measures for dynamic resolution and flicker.

It should be noted that while embodiments to which this invention are applied have been described, this invention is not limited to such embodiments. For example, while explanation has been made in the above-described embodiments in connection with the interlaced scanning of 2:1, similar operation can be realized by allowing the width of the discharge plasma region to be n times greater than the scanning unit in connection with the interlaced scanning of n:1. For example, using the interlaced scanning of 3:1, it is sufficient to allow the width of the discharge plasma region to be three times greater than the scanning unit. Moreover, in the case of the interlaced scanning of 4:1, it is sufficient to have a width of four times greater than the scanning unit.

Further, while respective discharge electrodes are comprised of anode electrodes and cathode electrodes which are paired in this embodiment, this invention is applicable to an image display device such that the electrodes are equidistantly arranged and operate as an anode electrode, or a cathode electrode for every field.

For example, it is assumed that the discharge electrodes . . . $E_1$, $E_{i+1}$, $E_{i+2}$ . . . are equidistantly arranged as shown in FIGS. 9A, 9B, 9C and 10A, 10B and 10C.

These discharge electrodes . . . $E_i$, $E_{i+1}$, $E_{i+2}$ . . . are connected to a d.c. power supply through resistors, and are grounded through drive transistors. By ON/OFF operation of these drive transistors, the electrodes operate as an anode electrode or a cathode electrode. Accordingly, the pitch between respective discharge electrodes ... $E_i$, $E_{i+1}$, $E_{i+2}$ ... serves as a scanning unit.

In the image display device thus constructed, when, e.g., a drive transistor for a discharge electrode $E_{i+1}$ is turned ON, this electrode operates as an anode, and other discharge electrodes operate as a cathode.

Thus, discharges take place between the discharge electrode $E_{i+1}$ and the discharge electrode $E_i$, and between the discharge electrode $E_{i+1}$ and the discharge electrode $E_{i+2}$. As a result, there are produced discharge plasma having a width which is twice as large as the electrode interval, i.e., the scanning unit.

Figure 9:
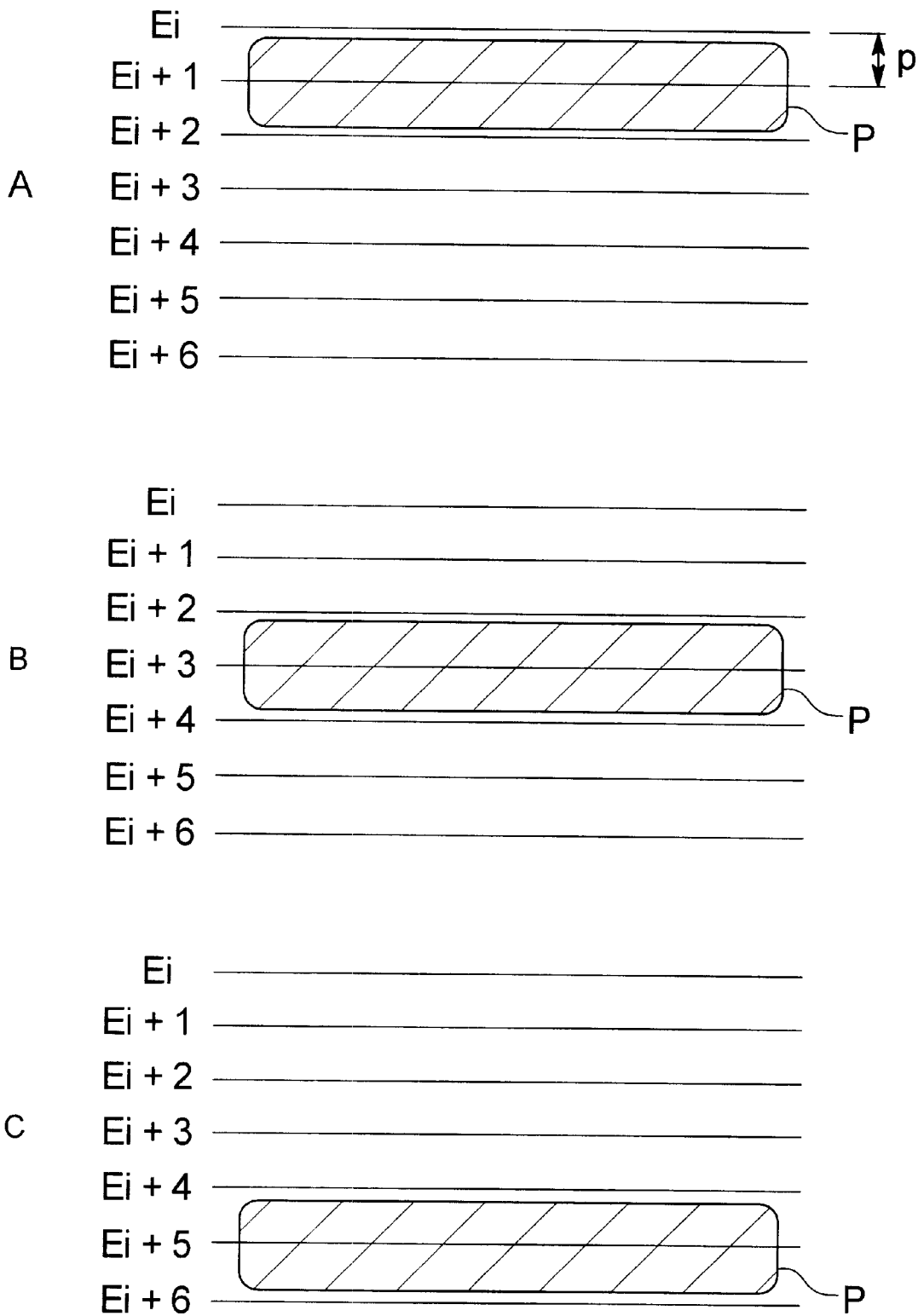
FIGS. 9A, 9B and 9C are views showing how discharge plasma in the even fields are scanned in another embodiment to which this invention is applied.
Figure 10:
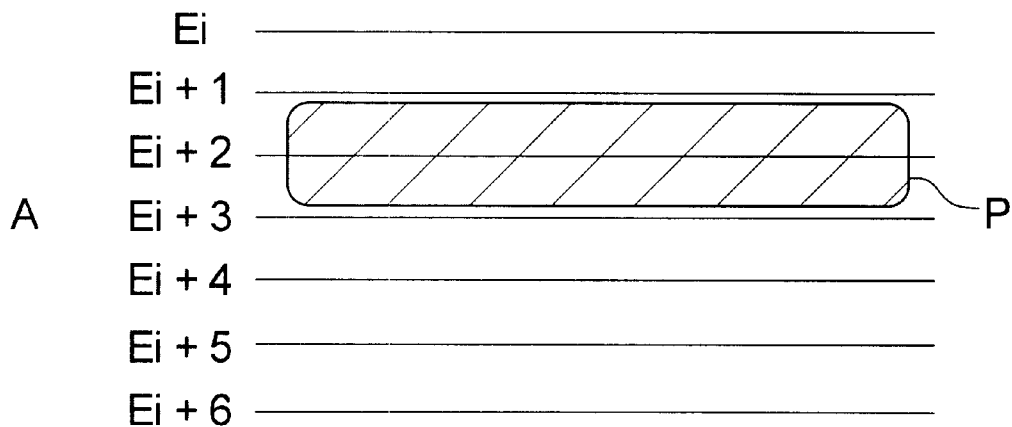
FIGS. 10A, 10B and 10C are views showing how discharge plasma in the odd fields are scanned in another embodiment to which this invention is applied.
Figure 10:
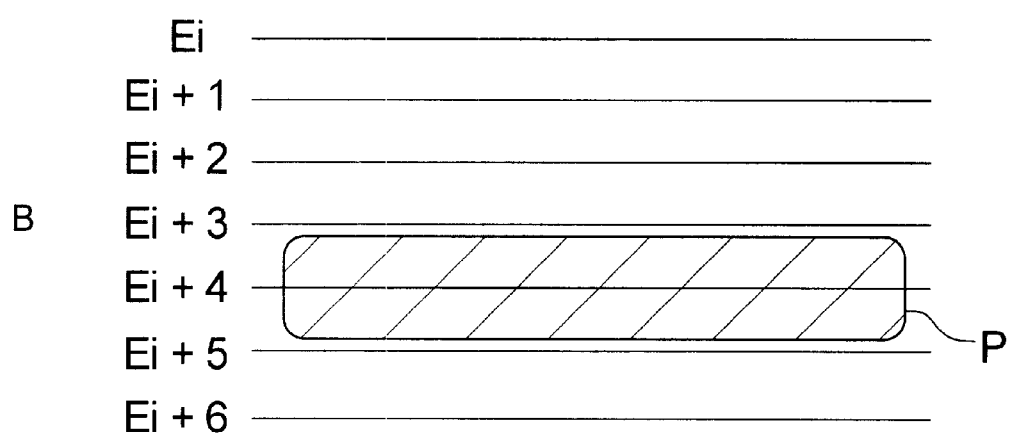
Figure 10:
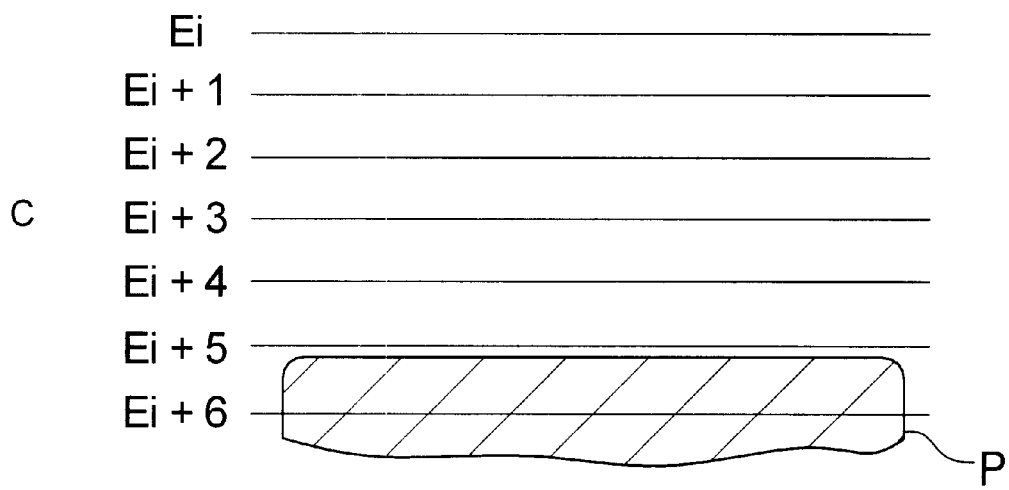
Figure 11:
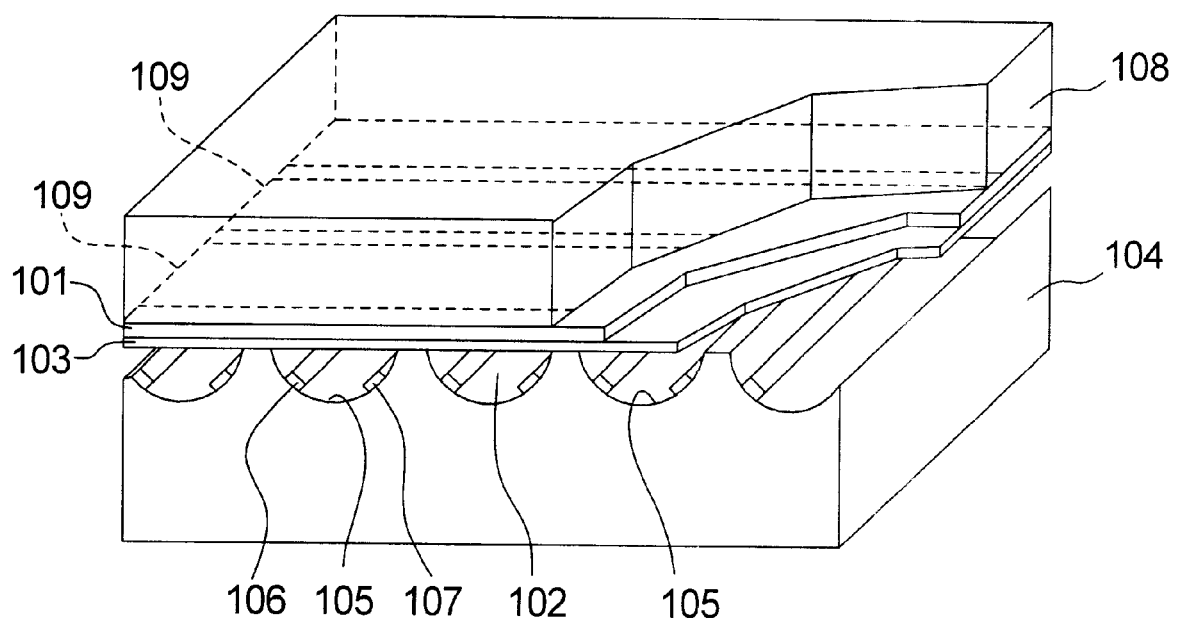
FIG. 11 is an enlarged perspective view showing, in a manner partially broken, an example of a conventional image display device.

In the case of the interlaced scanning of 2:1, in the odd fields, drive transistors connected to even discharge electrodes ... $E_{i+1}$, $E_{i+3}$, $E_{i+5}$ ... are turned ON in sequence. As a result, discharge plasma P having a width corresponding to two scanning units are sequentially produced as shown in FIGS. 9A, 8B and 8C. Similarly, in the odd fields, drive transistors connected to odd discharge electrodes ... $E_{i+2}$, $E_{i+4}$, $E_{i+6}$ ... are sequentially turned ON. As a result, discharge plasma P having a width corresponding to two scanning units are similarly produced as shown in FIGS. 10A, 10B and 10C.

Accordingly, in the same manner as in the previously described embodiment, all of the pixels on the screen are completely refreshed within one field also in this embodiment.

As is clear from the description, in the image display device of this embodiment, in the case of carrying out drive by the interlaced scanning system of n:1, the width of the discharge plasma corresponding to the scanning line is set to a value corresponding to n scanning lines or more. Accordingly, the entire frame can be refreshed every field. Thus, the problem of degradation of the dynamic resolution or flicker occurring in the case where an interlaced operation is carried can be eliminated.

In addition, there is not any burden on the drive circuit. This is extremely advantageous also from a viewpoint of the manufacturing cost. etc.

Although the invention has been described with respect to preferred embodiments, it is not to be so limited as changes and modifications can be made which are within the full intended scope of the invention as defined by the appended claims.

We claim as our invention:

1. An electro-optical device comprising:
   a first substrate having a plurality of substantially parallel non-overlapping first electrodes on a major surface thereof;
   a second substrate opposed to the first substrate and having a plurality of substantially parallel nonoverlapping second electrodes on a major surface thereof and the second electrodes extending in a different direction than the first electrodes so that they cross closely adjacent to each other;
   an electro-optical material layer disposed in contact with the first electrodes of the first substrate;
   a discharge chamber formed between the electro-optical material layer and the second substrate and filled with an ionizable gas, and means for providing discharge regions to define scanning units in the discharge chamber, the discharge regions being produced by selectively effecting ionization of the ionizable gas so that the scanning units are defined substantially in parallel to each other, the second electrodes being arranged so that the discharge region for all of the scanning units is formed as an open cell structure having a continuous space in the direction of scanning and over the entire lengths of the second electrodes; and
   scanning means for interlaced scanning of n:1, where n is an integer $\diamond 1$ and a spread of a respective discharge region is set so it spreads to a size which is n times as large as the scanning unit.

2. An electro-optical device as claimed in claim 1; further including a dielectric material layer mounted between the electro-optical material layer and the discharge chamber.

3. An electro-optical device as claimed in claim 1; wherein said second electrodes comprise a plurality of pairs of electrodes and each pair includes an anode and a cathode electrode.

4. An electro-optical device as claimed in claim 3; wherein said anode and cathode electrodes produce the discharge region containing the ionized gas.

5. An electro-optical device as claimed in claim 1; wherein said discharge region of all of said scanning units is formed as a continuous space.

6. An electro-optical device as claimed in claim 1; wherein said discharge region of a plurality of said scanning units is formed as a continuous space.

7. An electro-optical device as claimed in claim 1, wherein said second electrodes are arranged so that the discharge region for all of the scanning units is formed as a continuous space.

8. An electro-optical device as claimed in claim 1, wherein said second electrodes are arranged so that the discharge region for a plurality of the scanning units is formed as a continuous space.

9. An electro-optical device as claimed in claim 1, wherein said electro-optical material layer is positioned between the inner surfaces of the first and second substrates to form a display image.

10. An electro-optical device comprising:
    a first substrate having a plurality of substantially parallel first electrodes on the inner surface thereof;
    a second substrate opposed to the first substrate and having a plurality of substantially parallel second electrodes, said first and second electrodes mounted so that they are spaced-apart in the vertical and horizontal directions, respectively;
    an electro-optical material layer disposed in contact with the first electrodes of the first substrate; means for providing discharge regions to define scanning units in the discharge chamber
    a discharge chamber formed between the electro-optical material layer and the second substrate so that display elements are defined by overlapping areas of the first electrodes and a discharge region, a discharge region defining a scanning unit, the second electrodes being disposed on the second substrate so that the discharge region spreads over all of the scanning units defining substantially in parallel to each other as an open cell structure having a continuous space in the scanning direction and over the entire lengths of the second electrodes, the discharge chamber being filled with an ionizable gas;
    first means for applying a first electrical signal to the first electrodes;

second means for applying a second electrical signal to the second electrodes, the ionizable gas comprising an electrical switch which changes between plasma state and de-ionized state in response to the second signal which is applied; and, scanning means for interlaced scanning of n:1, where n is an integer ◊ 1 and a spread of a respective discharge region is set so it spreads to a size which is n times as large as the scanning unit.

11. An electro-optical device as claimed in claim 10; further including a dielectric material layer disposed between the electro-optical material layer and the discharge chamber so as to form a barrier between the electro-optical material and the ionizable gas.

12. An electro-optical device as claimed in claim 10; wherein said first electrical signal is a drive signal which is applied to the first electrodes.

13. An electro-optical device as claimed in claim 10; wherein said second electrical signal is a sampling clock signal which is applied to the second electrodes.

14. An electro-optical device as claimed in claim 10; wherein said electro-optical material layer comprises a liquid crystal.

* * * * *